Aug. 5, 1958 W. C. EWALDSON ET AL 2,845,989
DEVICE FOR SENSING MISALIGNED PIPE SEAM AND TWISTING SAME
Filed Dec. 8, 1953 5 Sheets-Sheet 1
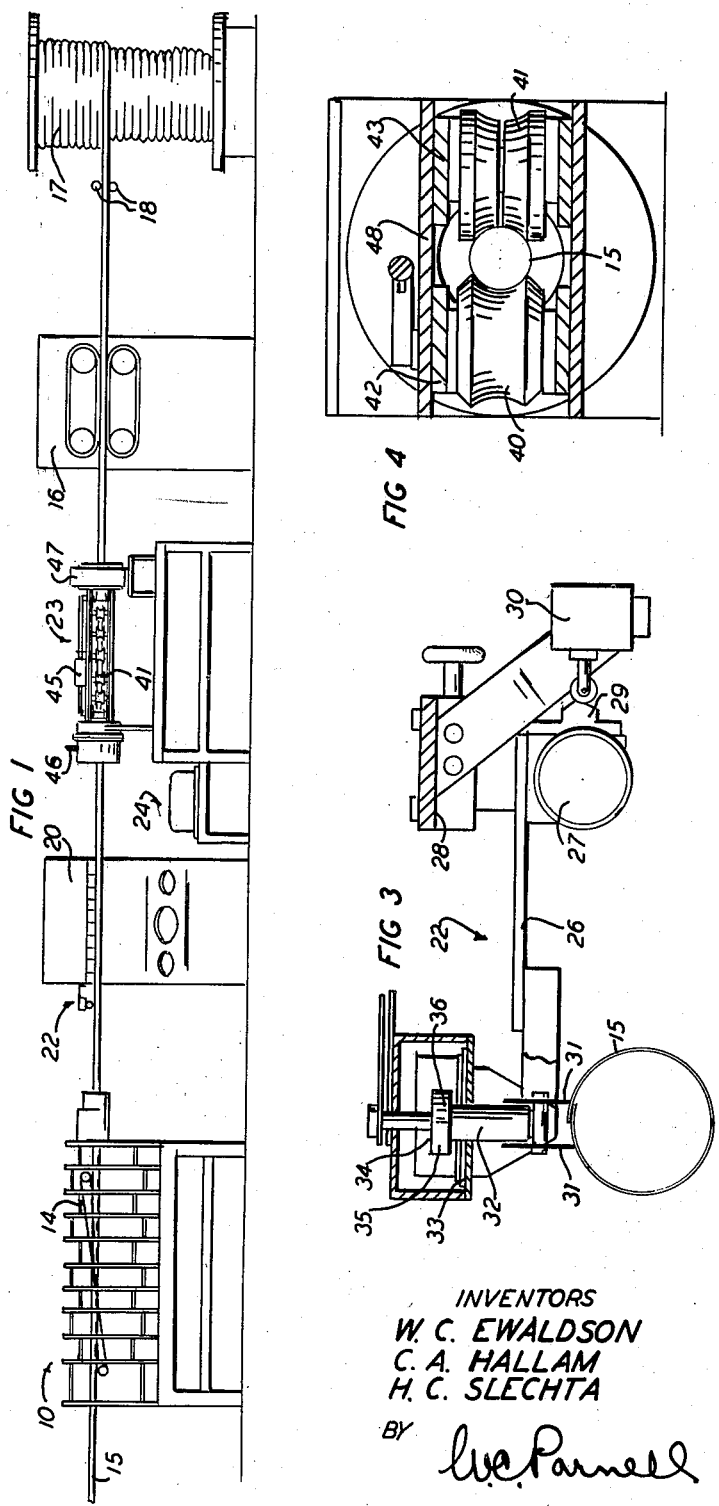
INVENTORS
W. C. EWALDSON
C. A. HALLAM
H. C. SLECHTA
BY
ATTORNEY Aug. 5, 1958   W. C. EWALDSON ET AL   2,845,989
DEVICE FOR SENSING MISALIGNED PIPE SEAM AND TWISTING SAME
Filed Dec. 8, 1953   5 Sheets-Sheet 2

INVENTORS
W. C. EWALDSON
C. A. HALLAM
H. C. SLECHTA
BY
W. C. Parnell
ATTORNEY

Aug. 5, 1958     W. C. EWALDSON ET AL     2,845,989
DEVICE FOR SENSING MISALIGNED PIPE SEAM AND TWISTING SAME

Filed Dec. 8, 1953     5 Sheets-Sheet 3

INVENTORS
W. C. EWALDSON
C. A. HALLAM
H. C. SLECHTA

BY *W. C. Parnell*

ATTORNEY

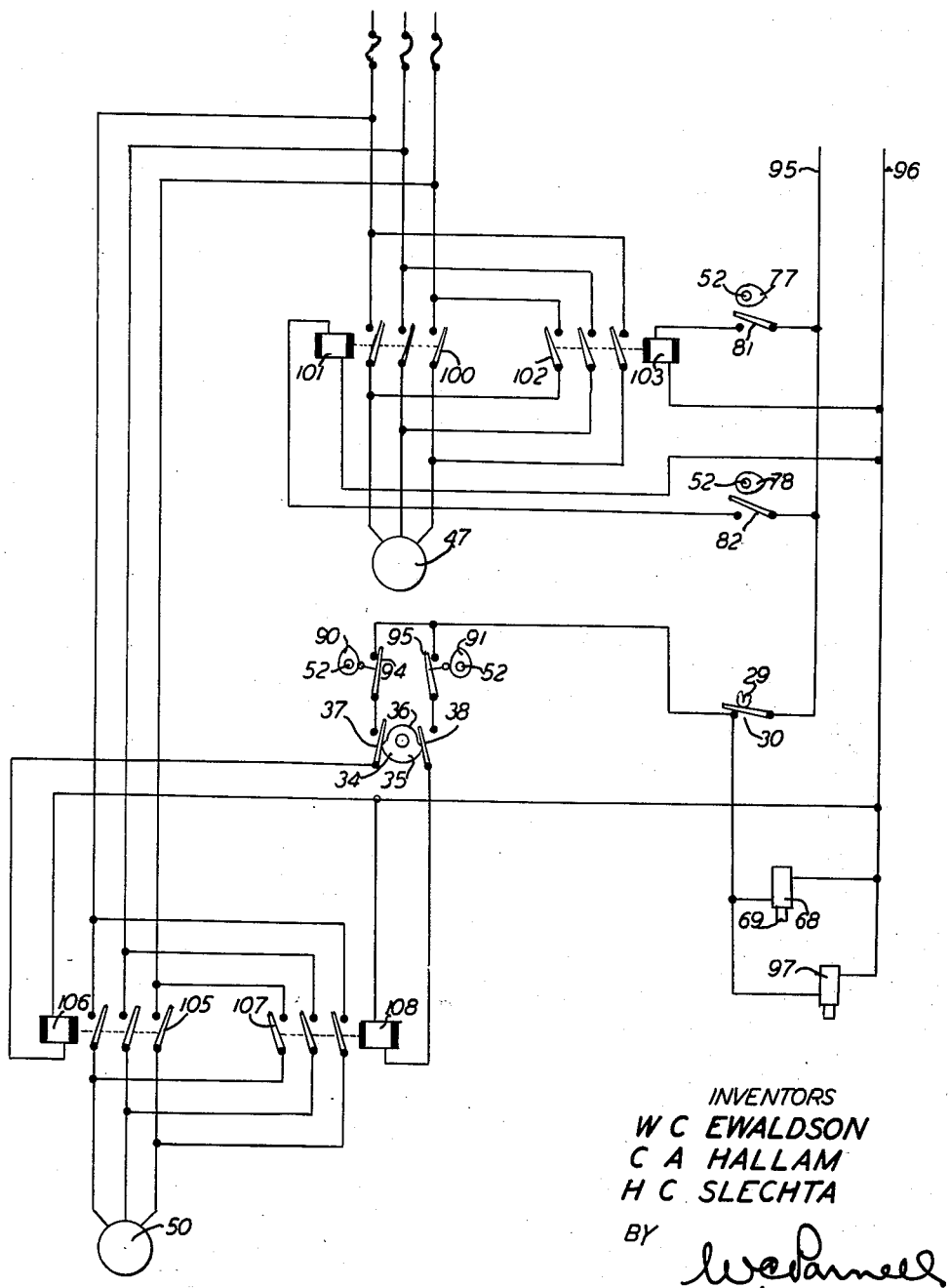

Aug. 5, 1958  W. C. EWALDSON ET AL  2,845,989
DEVICE FOR SENSING MISALIGNED PIPE SEAM AND TWISTING SAME
Filed Dec. 8, 1953  5 Sheets-Sheet 5
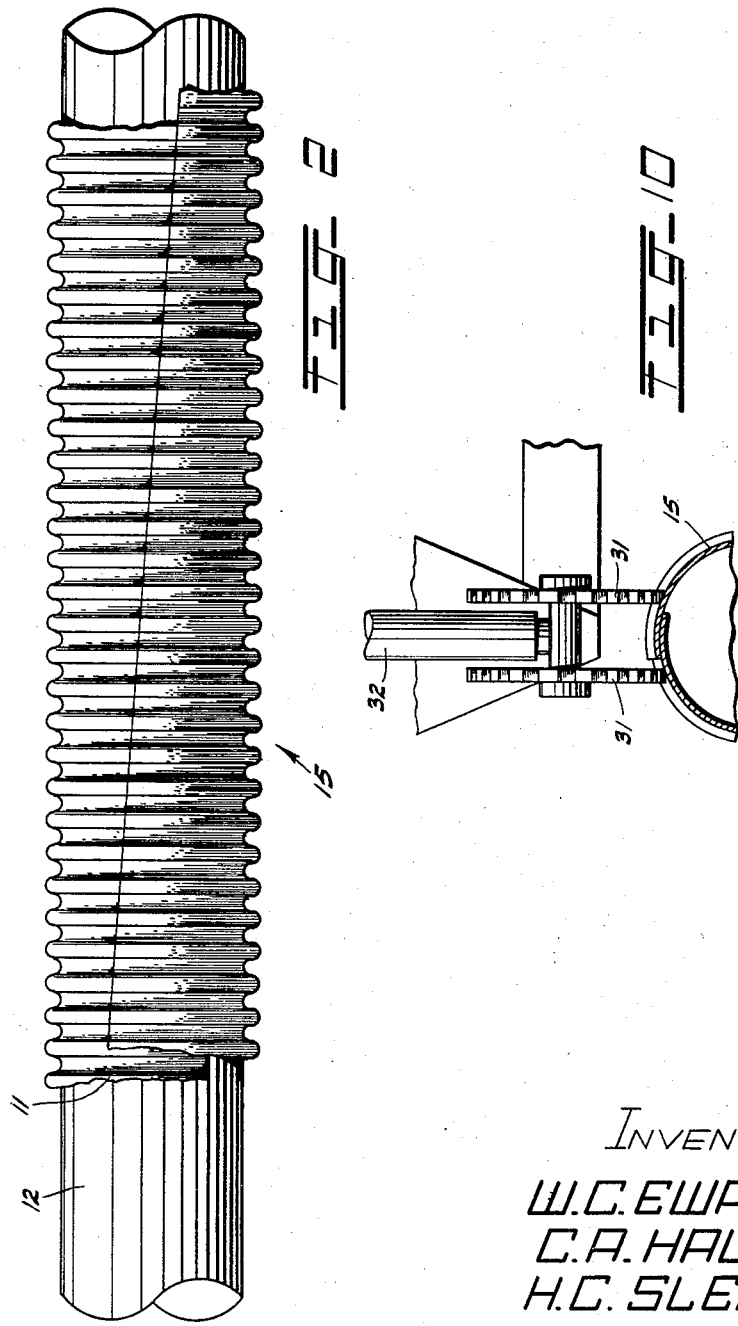
INVENTORS
W.C. EWALDSON
C.A. HALLAM
H.C. SLECHTA
By W.C. Parnell
ATTORNEY

United States Patent Office 2,845,989
Patented Aug. 5, 1958

2,845,989

DEVICE FOR SENSING MISALIGNED PIPE SEAM AND TWISTING SAME

Waldemar C. Ewaldson, Millington, Cecil A. Hallam, Westfield, and Henry C. Slechta, Plainfield, N. J., assignors to Western Electric Company, Incorporated, New York, N. Y., a corporation of New York Application December 8, 1953, Serial No. 396,884

16 Claims. (Cl. 153—78)

This invention relates to a control apparatus in a machine for making tubes and more particularly to apparatus for controlling the advancement of tubes with longitudinal seams relative to soldering or welding units.

During the manufacture of tubes with abutting or overlapping longitudinal edges to form seams which are to be soldered or welded, it is important that the tubes be held against twisting during their advancement longitudinally relative to the soldering or welding units.

In the manufacture of tubular sheaths for cable cores from strips of metal having laterally extending corrugations, the longitudinal edges of which are to be overlapped to form a longitudinal seam, it is more important that the tubular sheath be held against twisting. In tubes or sheaths of this type, the corrugated overlapping edges will remain matched and in interfitting engagement with each other only as long as the seam remains in a straight line parallel with the axis of the tube. Even a very slight deviation of the seam in either direction from the straight line will result in mismatching of the corrugated overlapping edges of the seam, preventing the production of a most efficient soldering or welding of the overlapping edges.

In the co-pending application of C. A. Hallam and E. W. Reynolds, Serial No. 396,867, filed December 8, 1953, now Patent 2,710,394, granted June 7, 1955, a sensing unit is disclosed which is highly sensitive to any deviations of the seam of a tube from a line parallel with its axis. In the co-pending application of W. C. Ewaldson and C. A. Hallam, Serial No. 396,946, filed December 8, 1953, a twisting or straightening unit disclosed as capable of gripping a tube and imparting a rocking motion to the tube without interfering with its longitudinal advancement. However, although the sensing unit detects any deviation in the path of the seam of the tube from that desired, the direction of this deviation and the amount thereof, there remains the solutions to the various problems of translating this information and controlling the operation of the straightening unit in the proper direction, for the required distance and during the application of the necessary pressure on the tube to return it to its desired position so that the seam will be straight in passing through the soldering or welding unit.

The object of this invention is a control apparatus adapted to efficiently provide the solutions to these problems.

With this and other objects in view, the invention comprises a control apparatus which is employed in combination with a sensing unit and a straightening unit during the longitudinal advancement of a tube having a longitudinal seam. The control apparatus comprises means responsive to the sensing unit to direct a fluid to the straightening unit under variable pressures and means to cause rotation of the straightening unit in the proper direction to straighten the seam of the tube. More specifically, the control unit is immediately responsive to the sensing unit to drive a motor in one direction or the other depending upon the direction of deflection of the seam from its straight line. This immediate action causes the application of fluid pressure to the gripping roller sections of the straightening unit and the energization of the reversible motor of the straightening unit in the proper direction whereby rotary movement of the roller supporting carriage of this unit will cause straightening of the tube.

Other objects and advantages will be apparent from the following detailed description when considered in conjunction with the accompanying drawings, wherein:

Fig. 1 is a side elevational view of a line of units in a tube or sheath forming machine embodying the invention;

Fig. 2 is a top plan view of the tube or cable sheath illustrating a possible deflection of the seam;

Fig. 3 is a vertical sectional view of the sensing unit;

Fig. 4 is an enlarged vertical sectional view of the straightening unit;

Fig. 9 is a wiring diagram for the control and straightening units, and

Fig. 10 is an enlarged fragmentary view of a portion of the sensing unit shown in Fig. 3.

Figure 5:
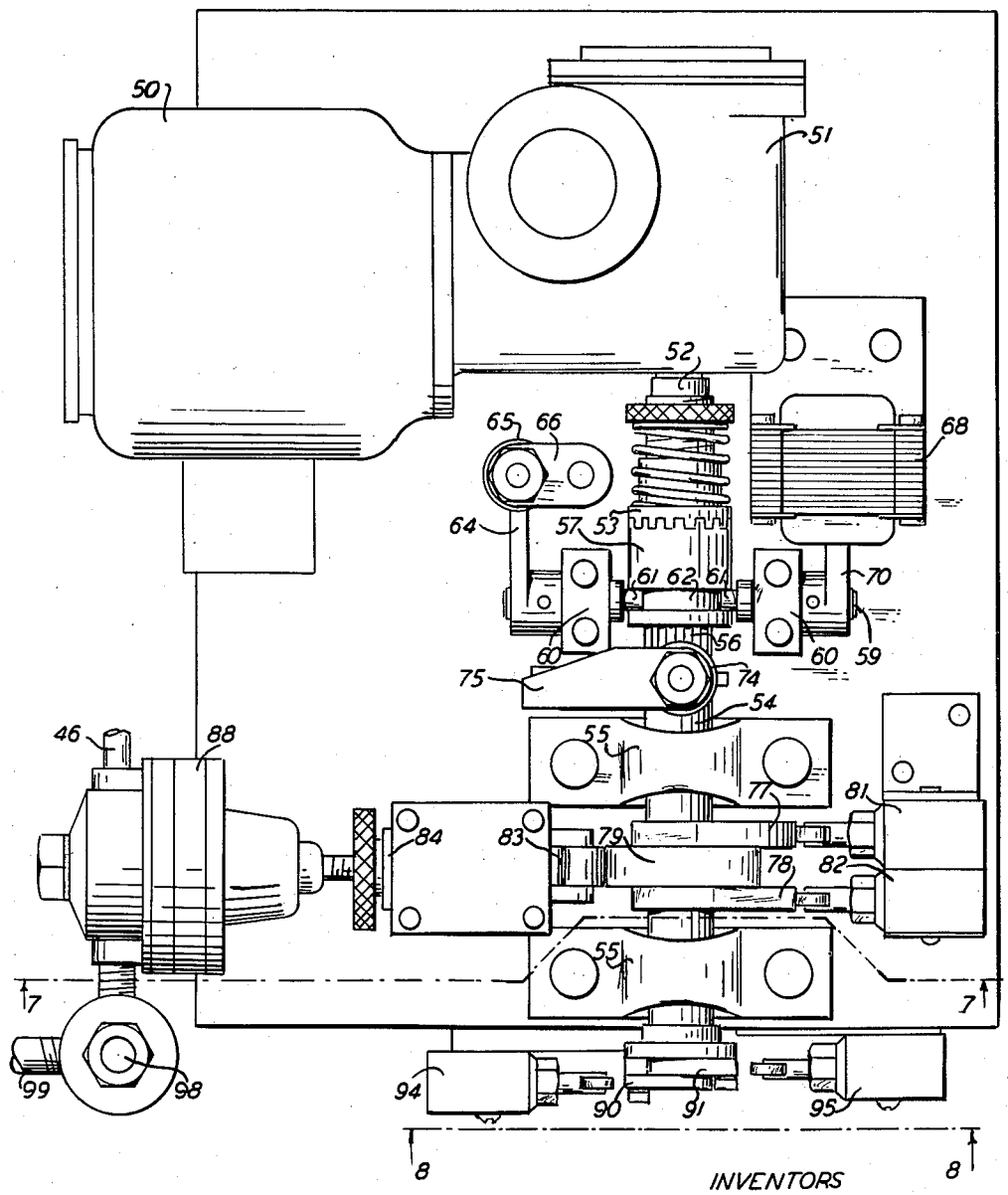
Fig. 5 is a top plan view of the control unit.
Figure 6:
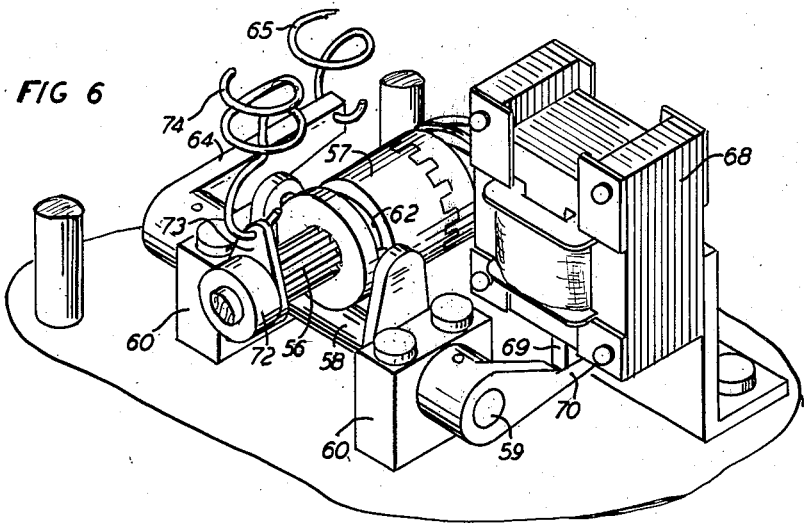
Fig. 6 is a fragmentary isometric view of a portion of the control unit adjacent the clutch thereof.

Referring now to the drawings, attention is first directed to Fig. 1 which illustrates a tube forming unit 10 which, in the present embodiment of the invention, is a sheath forming unit or apparatus for bending a strip of metal 11 (Fig. 2) with laterally extending corrugations (not shown) about a cable core 12 so that the edges will overlap and form a longitudinal seam. This forming apparatus is the subject matter of the co-pending application of E. W. Reynolds and H. C. Slechta, Serial No. 308,962, filed September 11, 1952 now Patent No. 2,764,214 patented September 25, 1956. The unit 10, as disclosed in the said co-pending application, has belts 14 which are driven in directions to assist in the advancement of the metal 11 and core 12 while they also assist in wrapping the metal 11 about the core. The tube or sheathed core 15 is caused to move longitudinally in a given path by a capstan drive 16 toward a driven takeup reel 17 where the tube or sheathed core is distributed on the reel through the aid of a suitable distributing means represented by rollers 18.

A soldering forming unit 20 is disposed a short distance from the exit end of the unit 10 to solder the overlapping edges of the tube or sheath. However, to produce a satisfactory structure, it is important that the seam, formed by the longitudinal edges, remain in a straight line parallel with the axis of the tube or sheath. This is more important during the formation of a tube or sheath from a corrugated strip in that the corrugated edges forming the seam may be held in close interfitting engagement with each other as long as the seam is straight and the corrugations of the edges remain matched. However, deviation of the seam in either direction will cause separation of the edges and prevent satisfactory soldering or welding of the edges as they pass through the unit 20.

Manufacturing arrangements of this type, composed of a plurality of units each assigned to perform its particular function, beginning with a separate core and metal strip and ending with a completed tube or sheathed core distributed uniformly on the takeup reel, produce certain conditions which tend to twist the tube or sheathed core in one direction or the other. To overcome these conditions and to maintain the seam of the tube substantially straight as it passes through the soldering unit 20, three additional units have been added to the aforementioned units including a sensing unit 22, a straightening unit 23 and a control unit 24. The sensing unit 22 is the subject matter of the aforementioned co-pending application of C. A. Hallam and E. W. Reynolds, and the straightening unit 23 is the subject matter of the aforementioned co-pending application of W. C. Ewaldson and C. A. Hallam.

The sensing unit 22 is shown, more in detail in Fig. 3, mounted in advance of the entrance end of the soldering unit 20 and including an arm 26 pivoted at 27 on a fixed support 28 and movable into and out of the operating position shown where a cam 29 will operate a normally open switch 30 into closed position and will position wheels 31 into engagement with the tube or sheath 15 upon opposite sides of the seam thereof. If the sheath or tube is formed of laterally corrugated material as shown in Figs. 2 and 10, the wheels 31 are provided with teeth (Fig. 10) formed to match and interengage the corrugations so that any deviation of the seam of the tube from a straight line causing mismatching of the edges forming the seam will apply opposing motions to the wheels causing them to rock the element 32 which supports them. The element 32 is itself rockably supported in a housing-like portion 33 at the forward end of the arm 26 and has a cam 34 fixed thereto with a high portion 35 and a low portion 36. When the seam is straight, switches 37 and 38 (shown only in Fig. 9) are allowed to remain normally open but are singly actuated into closed positions by rocking motion of the element 32 in one direction or the other.

The straightening unit 23 includes two sets of rollers 40 and 41 of suitable resilient material mounted for rotation in holders 42 and 43 which are identical in structure and actuable through a suitable mechanism including racks and pinions driven by a fluid operable unit 45 by receiving fluid under variable pressures from a fluid line 46. Furthermore, a reversible motor drive 47 is operatively connected to a carriage 48 in which the rollers and their holders are movably mounted so that through the function of the straightening unit 23 variable like forces may be applied simultaneously to the series of rollers causing them to grip the tube or cable sheath, and the drive means 47 may be energized in either direction depending upon the direction of deviation of the seam of the tube or sheath to straighten it.

The control unit or apparatus 24 (shown in Figs. 5 to 8 inclusive) includes a reversible motor 50 driving a speed reducing unit 51, which has an output shaft 52 provided with a clutch member 53. A driven shaft 54 journalled in bearings 55 has a splined end 56 on which a clutch member 57 is mounted and slidably connected thereto. A yoke 58 mounted on a spindle 59, which is journalled in bearing 60, has inwardly projecting pins 61 which interengage an annular groove 62 of the clutch member 57. A lever 64 mounted on one end of the spindle 59 has a spring 65 fixed thereto, the other end of the spring being connected to a fixed bracket 66 so that, through the force of the spring, the clutch member 57 will be urged into open position free of the clutch member 53.

A solenoid 68 is mounted at a position so that its core or plunger 69 (Figs. 6 and 9) may engage the adjacent end of a lever 70 which is mounted on the spindle 59 and actuable during energization of the solenoid to force the clutch closed, that is actuation of the yoke 58 to move the member 57 to cause intermeshing of the teeth of the clutch members 57 and 53. A splined collar 72 is mounted on the splined portion 56 of the shaft 54 and is made a part of a lever 73 which is connected to a spring 74, the upper end of the spring being connected to a fixed bracket 75 (Fig. 5) to apply sufficient force to the lever 73 to return the shaft 54 to a normal or starting position when such an occasion arises that this is possible.

Figure 7:
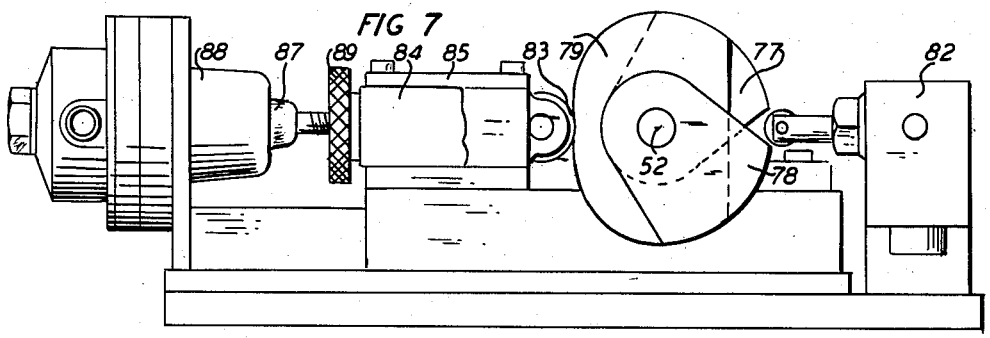
Fig. 7 is a vertical sectional view taken along the line 7—7 of Fig. 5.
Figure 8:
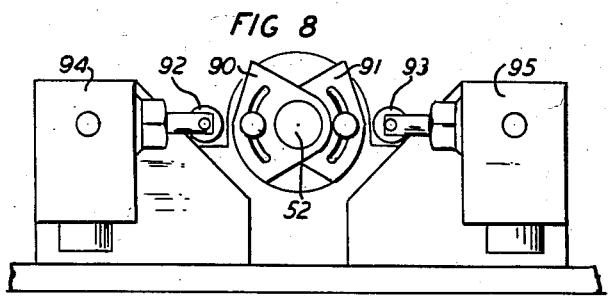
Fig. 8 is an end elevational view taken substantially along the line 8—8 of Fig. 5.

Three cams 77, 78 and 79 are mounted on the shaft 54 between the bearings 55. The cams 77 and 78 are of the contours shown in Fig. 7 and are adapted to actuate their respective switches 81 or 82 depending on the direction or rotation of the shaft 54. The cam 79 (as shown in Fig. 7) has a low portion engaging a roller 83 of a plunger 84 supported for reciprocation in bearing 85. Suitable means (not shown) normally urges the roller 83 of the plunger into engagement with the low portion of the cam 79, and when in this position, the movable portion 87 of a valve 88 will be at its outermost or closed position, this portion of the valve including an adjustable head 89. It will be noted that rocking motion of the shaft 54 in either direction will move increasingly higher portions of the cam 79 into engagement with the roller 83 to actuate the valve 88 by moving the member 87 variable distances inwardly to thereby cause the valve to direct a fluid with variable or increasing pressures through a fluid line 46 to the straightening unit 23 (Fig. 1).

The free end of the shaft 54 carries cams 90 and 91 adjustable relative to the rollers 92 and 93 of their switches 94 and 95 so that they may function to limit the fluid pressure applied to the rollers of the straightening unit.

Attention is directed now to Fig. 9 which illustrates the wiring diagram for the control apparatus including the cam 34 of the sensing unit 22 with its switches 37 and 38 and also the motor drive 47 for the straightening unit 23. The wiring diagram illustrates lines 95 and 96 from a 110 v. alternating current supply. When the sensing device 22 is in its operating position (shown in Fig. 3) the cam 29 closes the normally open switch 30 to complete circuits through solenoid 68 and solenoid 97. The solenoid 68, when energized, will close the clutch 53—57 and hold it closed as long as the switch 30 remains closed. The solenoid 97 operates a valve 98 (Fig. 5) into open position allowing fluid under a desired maximum pressure from a supply line 99 to pass into the valve 88.

The motors 47 and 50 are shown for connection with a three phase 440 v. supply. The reversible motor drive 47 is under the control of contacts 100 of a relay 101 and contacts 102 of a relay 103. Relay 101 is in a circuit with switch 82 and will be energized during closing of the switch 82 by its cam 78. The relay 103 is a circuit with switch 81 which may be closed by its cam 77. Therefore, it depends upon the direction of rotation of the shaft 52 as to which switch 81 or 82 will be closed to determine the direction of drive of the motor 47.

Motor 50 is under the control of contacts 105 of relay 106 and contacts 107 of relay 108. Relay 106 is in a circuit with switch 37, limit switch 94 and switch 30, while relay 108 is in a circuit with switch 38, limit switch 95 and switch 30.

Considering now the operation of the entire apparatus, let it be assumed that a condition exists tending to put a clockwise twist in the tube or sheathed core looking in the direction of travel thereof (as illustrated in Fig. 2). The twist in the corrugated sheath or tube shown in Fig. 2 is exaggerated for the purpose of illustration and the overlapping edges have been moved out of registration the distance of one complete corrugation. This condition will be translated through the wheels 31 of the sensing unit to the element 32, rocking it in a direction to cause its cam 34 to close switch 37, completing a circuit through relay 106, to close its contacts 105, to drive the motor 50 in one direction; for example, counterclockwise looking from the free end of the shaft 54 in Fig. 5. Energization of the motor 50 with its drive 51 to rotate the shaft 54 counterclockwise will cause the cam 78 to operate its switch 82 into closed position, energizing relay 101 to close contacts 100 to complete a circuit through the motor 47 to drive it in a counterclockwise direction, looking toward the entrance end of the straightening unit 23. The straightening unit will begin its rotation in a direction opposing the direction of deflection of the seam and at the same time, the rollers 40 and 41 of the straightening unit will be forced into engagement with the tube or sheathed core under increasing pressure caused by the turning of the cam 79 to force the plunger 84 to gradually open the valve 88 to permit fluid to pass through the fluid line 46 to operate the unit 45. The functioning of these units will continue, turning the straightening unit under increasing pressures on the rollers until the seam has been straightened, at which time the sensing device will be affected to the extent that the cam 34 thereof will allow the switch 37 to open. As a safety factor controlling the maximum pressure to be applied to the rollers 42—41, the cams 90 and 91 on the free end of the shaft 54 will operate singly depending on the direction of movement of the shaft operate its respective switch 94—95, which in the present instance would be the plunger 92 of the switch 94. In this manner, if the desired maximum pressure has been reached before the switch 37 is opened, that is, before the seam is straight, the circuit to relay 106 is opened by opening switch 94. This de-energizes motor 50 but holds the control means in this position due to the fact that the clutch 53—57 remains closed during continued energization of the solenoid 68, holding the shaft 54 and its cams in the present position to allow continued rotation of the straighening unit 23.

If the straightening unit has provided a twisting force greater than that inherent in the tube and has produced an overtwist in the tube this will affect the sensing unit 22 causing it to rock the element 32 in a direction to close switch 38, thus energizing relay 108 to operate its contacts 107 to energize the motor 50 to drive the shaft 54 clockwise. Attention is directed to the fact that this reverse motion of the shaft 54 begins at the position where its motion counterclockwise stopped, leaving the cams on the shaft in certain positions that is with the switch 82 operated as well as possibly switch 94. Movement of the shaft 52 clockwise will first cause a reduction in the pressure applied through the rollers to the tube or sheathed core due to the fact that the increasingly lower portions of the cam 79 will move relative to the roller 83 effectively decreasing the fluid pressure from the valve 88 to the straightening unit. If the inherent twisting force in the tube or sheathed core is balanced by the twisting force of the straightening unit 23 after rocking movement of the shaft 54 clockwise a given distance less than that required to return the cams to their normal positions, this balancing effect will again return the seam of the tube to a straight line and the sensing unit will be balanced causing its cam 34 to permit opening of switch 38. This condition continues to exist and the shaft 54 may remain idle as its motor 50 has again been re-energized through the opening of the switch 38 and it may be presumed that the required pressure through the valve 88 to the straightening unit 23 coupled with the rotating force of the straightening unit has been made sufficient to counteract the inherent opposing twisting force in the tube or sheathed core.

It will be apparent that a tube or sheathed core free of any constant tendency to twist it in one direction but subject to twist in either direction through any causes, will immediately cause actuation of either switch 37 or 38 through the function of the sensing unit 22 and start operation of the straightening unit 23 through the efficient actuation of the control apparatus 24, maintaining or varying these conditions depending upon the twist in the cable or tube, the directions of these twists and the forces required to counteract them to maintain the seam of the tube or sheathed core straight as it passes through the soldering unit.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. The combination with a unit to form longitudinally advanced material into a tube with overlapping edges forming a seam at a given position in the unit and held against rotation when leaving the forming unit, a sensing unit having a rockable element adapted to engage the tube and be caused to rock in either direction by deflection of the seam in either direction from alignment with said position resulting from a twist in the tube, and a straightening unit with a reversible drive and fluid actuable means to move portions of the straightening unit into gripping engagement with the tube and under variable pressures to twist the tube relative to said position in either direction to straighten the seam, of a conrtol apparatus comprising means responsive to the sensing unit to direct a fluid to the straightening unit under increasing pressure to cause the straightening unit to straighten the seam, and means actuable to terminate the supply of fluid to the straightening unit when a predetermined pressure has been reached.

2. The combination with a unit to form longitudinally advanced material into a tube with overlapping edges forming a seam at a given position in the unit and held against rotation when leaving the forming unit, a sensing unit having a rockable element adapted to engage the tube and be caused to rock in either direction by deflection of the seam in either direction from alignment with said position resulting from a twist in the tube, and a straightening unit with a reversible drive and fluid actuable means to move portions of the straightening unit into gripping engagement with the tube and under variable pressures to twist the tube relative to said position in either direction to straighten the seam, of a control apparatus comprising means to cause the portions of the straightening unit to move into gripping engagement with the tube, and means responsive to the rocking element of the sensing unit to cause the drive to turn the straightening unit in a direction opposing the direction of deflection of the seam to straighten the seam.

3. The combination with a unit to form longitudinally advanced material into a tube with overlapping edges forming a seam at a given position in the unit and held against rotation when leaving the forming unit, a sensing unit having a rockable element adapted to engage the tube and be caused to rock in either direction by deflection of the seam in either direction from alignment with said position resulting from a twist in the tube, and a straightening unit with a reversible drive and fluid actuable means to move portions of the straightening unit into gripping engagement with the tube and under variable pressures to twist the tube relative to said position in either direction to straighten the seam, of a control apparatus comprising means to cause the portions of the straightening unit to move into gripping engagement with the tube, means responsive to the rocking element of the sensing unit to cause the drive to turn the straightening unit in a direction opposing the direction of deflection of the seam to straighten the seam, and means to render the straightening unit unoperated when the seam is straight.

4. The combination with a unit to form longitudinally advanced material into a tube with overlapping edges forming a seam at a given position in the unit and held against rotation when leaving the forming unit, a sensing unit having a rockable element adapted to engage the tube and be caused to rock in either direction by deflection of the seam in either direction from alignment with said position resulting from a twist in the tube, and a straightening unit with a reversible drive and fluid actuable means to move portions of the straightening unit into gripping engagement with the tube and under variable pressures to twist the tube relative to said position in either direction to straighten the seam, of a control apparatus comprising means responsive to the sensing unit to cause driving of the straightening unit in a direction opposing the direction of deflection of said seam, fluid control means actuable to direct a fluid under increasing pressure to the gripping means of the straightening unit to move the portions into gripping engagement with the tube and cause them to apply increasing gripping force to the tube, and means to terminate the increasing pressure to the straightening unit when the seam is straight.

5. The combination with a unit to form longitudinally advanced material into a tube with overlapping edges forming a seam at a given position in the unit and held against rotation when leaving the forming unit, a sensing unit having a rockable element adapted to engage the tube and be caused to rock in either direction by deflection of the seam in either direction from alignment with said position resulting from a twist in the tube, and a straightening unit with a reversible drive and fluid actuable means to grip the tube under variable pressures to twist the tube relative to said position in either direction to straighten the seam, of a control apparatus comprising means responsive to the sensing unit to cause driving of the straightening unit in a direction opposing the direction of deflection of said seam, fluid control means actuable to direct a fluid under increasing pressure to the gripping means of the straightening unit to cause the application of increasing gripping force on the tube, means to terminate the increasing pressure to the straightening unit when the seam is straight, and means responsive to the sensing unit resulting from an overtwist of the tube beyond its stright position to cause the fluid control means to reduce the pressure to the gripping means.

6. The combination with a unit to form longitudinally advanced material into a tube with overlapping edges forming a seam at a given position in the unit and held against rotation when leaving the forming unit, a sensing unit having a rockable element adapted to engage the tube and be caused to rock in either direction by deflection of the seam in either direction from alignment with said position resulting from a twist in the tube, and a straightening unit with a reversible drive and fluid actuable means to grip the tube under variable pressures to twist the tube relative to said position in either direction to stragihten the seam, of a control apparatus comprising means responsive to the sensing unit to cause driving of the straightening unit in a direction opposing the direction of deflection of said seam, fluid control means actuable to direct a fluid under increasing pressure to the gripping means of the straightening unit to cause the application of increasing gripping force on the tube, means to terminate the increasing pressure to the straightening unit when the seam is straight, means responsive to the sensing unit resulting from an overtwist of the tube beyond its straight position to cause the fluid control to reduce the pressure to the gripping means, and means responsive to said overtwist to drive the straightening unit in the opposite direction.

7. The combination with a unit to form longitudinally advanced material into a tube with overlapping edges forming a seam at a given position in the unit and held against rotation when leaving the forming unit, a sensing unit having a rockable element adapted to engage the tube and be caused to rock in either direction by deflection of the seam in either direction from alignment with said position resulting from a twist in the tube, and a straightening unit with a reversible drive and fluid actuable means to grip the tube under variable pressures to twist the tube relative to said position in either direction to straighten the seam, of a control apparatus comprising means responsive to the sensing unit to cause driving of the straightening unit in a direction opposing the direction of deflection of said seam, fluid control means actuable to direct a fluid under increasing pressure to the gripping means of the straightening unit to cause the application of increasing gripping force on the tube, means to terminate the increasing pressure to the straightening unit when the seam is straight, means responsive to the sensing unit resulting from an overtwist of the tube beyond its straight position to cause the fluid control to reduce the pressure to the gripping means, means responsive to said overtwist to drive the straightening unit in the opposite direction and means actuable with the drive of the stragihtening unit in the opposite direction to cause the fluid control means to cause the gripping means to apply increasing gripping force to the tube.

8. The combination with a unit to form longitudinally advanced material into a tube with overlapping edges forming a seam at a given position in the unit and held against rotation when leaving the forming unit, a sensing unit having a rockable element adapted to engage the tube and be caused to rock in either direction by deflection of the seam in either direction from alignment with said position resulting from a twist in the tube, and a straightening unit with a reversible drive and fluid actuable means to move portions of the straightening unit into gripping engagement with the tube and under variable pressures to twist the tube relative to said position in either direction to straighten the seam, of a control apparatus comprising a rotatable shaft, cams mounted at spaced positions thereon, a reversible motor drive for the shaft, means responsive to the sensing unit to cause the motor to drive the shaft in a given direction depending on the direction of movement of the rocking element of the sensing unit by a deflection of the seam in a given direction and means actuable by certain of the cams to cause the drive for the straightening unit to drive it in a direction opposing the direction of deflection of the seam.

9. The combination with a unit to form longitudinally advanced material into a tube with overlapping edges forming a seam at a given position in the unit and held against rotation when leaving the forming unit, a sensing unit having a rockable element adapted to engage the tube and be caused to rock in either direction by deflection of the seam in either direction from alignment with said position resulting from a twist in the tube, and a straightening unit with a reversible drive and fluid actuable means to grip the tube under variable pressures to twist the tube relative to said position in either direction to straighten the seam, of a control apparatus comprising a rotatable shaft, cams mounted at spaced positions thereon, a reversible motor drive for the shaft, means responsive to the sensing unit to cause the motor to drive the shaft in a given direction depending on the direction of movement of the rocking element of the sensing unit by a deflection of the seam in a given direction, means actuable by certain of the cams to cause the drive for the straightening unit to drive it in a direction opposing the direction of deflection of the seam, and means actuable by one of the cams to apply pressure to the gripping means of the straightening unit.

10. The combination with a unit to form longitudinally advanced material into a tube with overlapping edges forming a seam at a given position in the unit and held against rotation when leaving the forming unit, a sensing unit having a rockable element adapted to engage the tube and be caused to rock in either direction by deflection of the seam in either direction from alignment with said position resulting from a twist in the tube, and a straightening unit with a reversible drive and fluid actuable means to grip the tube under variable pressures to twist the tube relative to said position in either direction to straighten the seam, of a control apparatus comprising a rotatable shaft, cams mounted at spaced positions thereon, a reversible motor drive for the shaft, means responsive to the sensing unit to cause the motor to drive the shaft in a given direction depending on the direction of movement of the rocking element of the sensing unit by a deflection of the seam in a given direction, means actuable by certain of the cams to cause the drive for the straightening unit to drive it in a direction opposing the direction of deflection of the seam, and means actuable by one of the cams to apply increasing pressure to the gripping means of the straightening unit during rotation of the shaft.

11. The combination with a unit to form longitudinally advanced material into a tube with overlapping edges forming a seam at a given position in the unit and held against rotation when leaving the forming unit, a sensing unit having a rockable element adapted to engage the tube and be caused to rock in either direction by deflection of the seam in either direction from alignment with said position resulting from a twist in the tube, and a straightening unit with a reversible drive and fluid actuable means to grip the tube under variable pressures to twist the tube relative to said position in either direction to straighten the seam, of a control apparatus comprising a rotatable shaft, cams mounted at spaced positions thereon, a reversible motor drive for the shaft, means responsive to the sensing unit to cause the motor to drive the shaft in a given direction depending on the direction of movement of the rocking element of the sensing unit by a deflection of the seam in a given direction, means actuable by certain of the cams to cause the drive for the straightening unit to drive it in a direction opposing the direction of deflection of the seam, means actuable by one of the cams to apply increasing pressure to the gripping means of the straightening unit during rotation of the shaft, and means responsive to one of the cams to stop the motor and shaft when a maximum pressure to the gripping means has been reached.

12. The combination with a unit to form longitudinally advanced material into a tube with overlapping edges forming a seam at a given position in the unit and held against rotation when leaving the forming unit, a sensing unit having a rockable element adapted to engage the tube and be caused to rock in either direction by deflection of the seam in either direction from alignment with said position resulting from a twist in the tube, and a straightening unit with a reversible drive and fluid actuable means to grip the tube under variable pressures to twist the tube relative to said position in either direction to straighten the seam, of a control apparatus comprising a rotatable shaft, cams mounted at spaced positions thereon, a reversible motor drive for the shaft, means responsive to the sensing unit to cause the motor to drive the shaft in a given direction depending on the direction of movement of the rocking element of the sensing unit by a deflection of the seam in a given direction, means actuable by certain of the cams to cause the drive for the straightening unit to drive it in a direction opposing the direction of deflection of the seam, means actuable by one of the cams to apply increasing pressure to the gripping means of the straightening unit during rotation of the shaft, and means responsive to the sensing unit to reverse the motor drive to reverse the direction of rotation of the shaft to cause reversing of the drive of the straightening unit.

13. The combination with a unit to form longitudinally advanced material into a tube with overlapping edges forming a seam at a given position in the unit and held against rotation when leaving the forming unit, a sensing unit having a rockable element adapted to engage the tube and be caused to rock in either direction by deflection of the seam in either direction from alignment with said position resulting from a twist in the tube, and a straightening unit with a reversible drive and fluid actuable means to grip the tube under variable pressures to twist the tube relative to said position in either direction to straighten the seam, of a control apparatus comprising a rotatable shaft, cams mounted at spaced positions thereon, a reversible motor drive for the shaft, means responsive to the sensing unit to cause the motor to drive the shaft in a given direction depending on the direction of movement of the rocking element of the sensing unit by a deflection of the seam in a given direction, means actuable by certain of the cams to cause the drive for the straightening unit to drive it in a direction opposing the direction of deflection of the seam, means actuable by one of the cams to apply increasing pressure to the gripping means of the straightening unit during rotation of the shaft, and means responsive to the sensing unit to reverse the motor drive, to reverse the direction of rotation of the shaft and the cams thereon to reduce the pressure to the gripping means to its minimum and to stop the drive for the straightening unit.

14. The combination with a unit to form longitudinally advanced material into a tube with overlapping edges forming a seam at a given position in the unit and held against rotation when leaving the forming unit, a sensing unit having a rockable element adapted to engage the tube and be caused to rock in either direction by deflection of the seam in either direction from alignment with said position resulting from a twist in the tube, and a straightening unit with a reversible drive and fluid actuable means to grip the tube under variable pressures to twist the tube relative to said position in either direction to straighten the seam, of a control apparatus comprising a rotatable shaft, cams mounted at spaced positions thereon, a reversible motor drive for the shaft, means responsive to the sensing unit to cause the motor to drive the shaft in a given direction depending on the direction of movement of the rocking element of the sensing unit by a deflection of the seam in a given direction, means actuable by certain of the cams to cause the drive for the straigthtening unit to drive it in a direction opposing the direction of deflection of the seam, means actuable by one of the cams to apply increasing pressure to the gripping means of the straightening unit during rotation of the shaft, means responsive to the sensing unit to reverse the motor drive, to reverse the direction of rotation of the shaft and the cams thereon to reduce the pressure to the gripping means to its minimum and to stop the drive for the straightening unit, and means actuated by another cam on the shaft to reverse the drive for the straightening unit.

15. The combination with a unit to form longitudinally advanced material into a tube with overlapping edges forming a seam at a given position in the unit and held against rotation when leaving the forming unit, a sensing unit having a rockable element adapted to engage the tube and be caused to rock in either direction by deflection of the seam in either direction from alignment with said position resulting from a twist in the tube, and a straightening unit with a reversible drive and fluid actuable means to grip the tube under variable pressures to twist the tube relative to said position in either direction to straighten the seam, of a control apparatus comprising a rotatable shaft, cams mounted at spaced positions thereon, a reversible motor drive for the shaft, means responsive to the sensing unit to cause the motor to drive the shaft in a given direction depending on the direction of movement of the rocking element of the sensing unit by a deflection of the seam in a given direction, means actuable by certain of the cams to cause the drive for the straightening unit to drive it in a direction opposing the direction of deflection of the seam, a normally open clutch interposed between the motor drive and the shaft, and means responsive to the positioning of the sensing unit in engagement with a tube to close the clutch.

16. The combination with a unit to form longitudinally advanced material into a tube with overlapping edges forming a seam at a given position in the unit and held against rotation when leaving the forming unit, a sensing unit having a rockable element adapted to engage the tube and be caused to rock in either direction by deflection of the seam in either direction from alignment with said position resulting from a twist in the tube, and a straightening unit with a reversible drive and fluid actuable means to move portions of the straightening unit into gripping engagement with the tube and under variable pressures to twist the tube relative to said position in either direction to straighten the seam, of a control apparatus comprising a rotatable shaft, cams mounted at spaced positions thereon, a reversible motor drive for the shaft, means responsive to the sensing unit to cause the motor to drive the shaft in a given direction depending on the direction of movement of the rocking element of the sensing unit by a deflection of the seam in a given direction, means actuable by certain of the cams to cause the drive for the straightening unit to drive it in a direction opposing the direction of deflection of the seam, a normally open clutch interposed between the motor drive and the shaft, means responsive to the positioning of the sensing unit in engagement with a tube to close the clutch, and means actuable when the clutch is open to return the shaft to a predetermined starting position.

References Cited in the file of this patent

UNITED STATES PATENTS

| | | |
|---|---|---|
| 1,997,272 | Adams | Apr. 9, 1935 |
| 2,130,586 | Huston | Sept. 20, 1938 |
| 2,268,368 | Anderson | Dec. 30, 1941 |
| 2,499,853 | Eckel et al. | Mar. 7, 1950 |
| 2,526,723 | Berkeley | Oct. 24, 1950 |
| 2,557,046 | Evans | June 12, 1951 |
| 2,582,963 | Cachat | Jan. 22, 1952 |